United States Patent [19]
Matthews et al.

[11] 3,761,788

[45] Sept. 25, 1973

[54] ELECTRONIC SWITCH MODULE WITH CERAMIC CASE

[75] Inventors: Benjamin H. Matthews, Peninsula; Jules W. Rhine, Bedford, both of Ohio

[73] Assignee: Lucerne Products, Inc., Northfield, Ohio

[22] Filed: Aug. 10, 1971

[21] Appl. No.: 170,496

[52] U.S. Cl. .................................. 318/345, 310/50
[51] Int. Cl. .................................. H02p 5/16
[58] Field of Search .................................. 310/50, 68 A; 318/345; 200/157

[56] References Cited

UNITED STATES PATENTS

| | | | |
|---|---|---|---|
| 3,543,120 | 11/1970 | Robertson | 318/345 |
| 3,536,973 | 10/1970 | Matthews | 318/345 |
| 3,590,194 | 6/1971 | Frenzel | 318/345 |

*Primary Examiner*—Bernard A. Gilheany
*Assistant Examiner*—Thomas Langer
*Attorney*—Baldwin, Egan, Walling & Fetzer

[57] ABSTRACT

A compact electronic switch module for controlling an electric motor, with the switch module including a sectional switch case mounting various of the switch circuit components thereon, with at least one section of the switch case comprising ceramic material providing a support for components of the switch circuit. The ceramic section facilitates the manufacture and assembly of the switch circuitry which includes solid state switching means, and provides a heat sink for the switching means, as well as facilitating soldering operations on the switch circuitry.

4 Claims, 13 Drawing Figures

INVENTORS
BENJAMIN H. MATTHEWS
JULES W. RHINE
BY

Baldwin, Egan, Walling & Fetzer
ATTORNEYS

INVENTORS
BENJAMIN H. MATTHEWS
BY JULES W. RHINE
Baldwin, Egan, Walling & Fetzer
ATTORNEYS

ELECTRONIC SWITCH MODULE WITH CERAMIC CASE

This invention relates in general to a compact electrical switch for controlling an electric motor, and more particularly to a compact electrical switch for selectively varying the speed of an electric motor, such as, for instance, an electric motor of a hand operated power tool or utensil, and wherein the switch circuit includes a printed circuit portion formed on a ceramic section of the speed control casing.

BACKGROUND OF THE INVENTION

There are numerous switches known in the prior art for controlling an electric motor of an electric, hand type tool or utensil.

The present invention relates to the type of switch shown, for instance, in U.S. Pat. No. 3,536,973, issued Oct. 27, 1970 in the name of B. H. Matthews, et al and entitled "Switch and Speed Control for an Electric Motor." Such switch includes a speed control switch case formed of insulating material such as, for instance plastic, which mounts various components of the switch mechanism therein and thereon. The manufacture and assembly of such switch is a comparatively time consuming and expensive procedure and in practice necessitates considerable hand operations, including soldering operations for connecting the various components of the switch mechanism in circuit in the speed control casing. This, of course, operates to increase the cost of the switch mechanism.

SUMMARY OF THE INVENTION

The present invention provides an electrical switch of the general speed control type of the aforementioned U.S. Pat. No. 3,536,973, and wherein at least one section of the speed control switch case is formed of ceramic material having a printed circuit applied thereto, and wherein certain components of the switch circuitry are expeditiously mounted on the ceramic case section and can be coupled in circuit in an expeditious manner, for providing a speed control switch which is more economical to manufacture and assemble, and which results in a switch which is operative to smoothly and effectively control an electric motor in a compact environment.

Accordingly, an object of the invention is to provide a novel electrical control switch.

Another object of the invention is to provide a novel electrical control switch of the variable speed type.

Another object of the invention is to provide an electrical control switch assembly of the variable speed type, comprising finger actuated movable bridging contact means for making and breaking the switch circuit, and wherein actuation of the switch automatically actuates a rheostat arrangement for varying the magnitude of electrical energy input to an associated electric motor, and wherein the switch includes a switch case having at least one section of ceramic material with printed circuitry mounted thereon for coupling together various components of the switch circuit, and which materially facilitates manufacture of the switch mechanism.

Another object of the invention is to provide a trigger-switch assembly of the latter mentioned type which is of a highly compact economical nature and which is expeditiously manufactureable and assemblable, and capable of being massed produced.

A still further object of the invention is to provide a switch assembly which is of the above-mentioned variable speed control type, and wherein the speed control switch circuit includes printed circuit means mounted on a ceramic member which serves as one section of the speed control switch casing.

Other objects and advantages of the invention will be apparent from the following description taken in conjunction with the accompanying drawings wherein:

DESCRIPTION OF PREFERRED EMBODIMENT

Figures 1, 2, 2A:
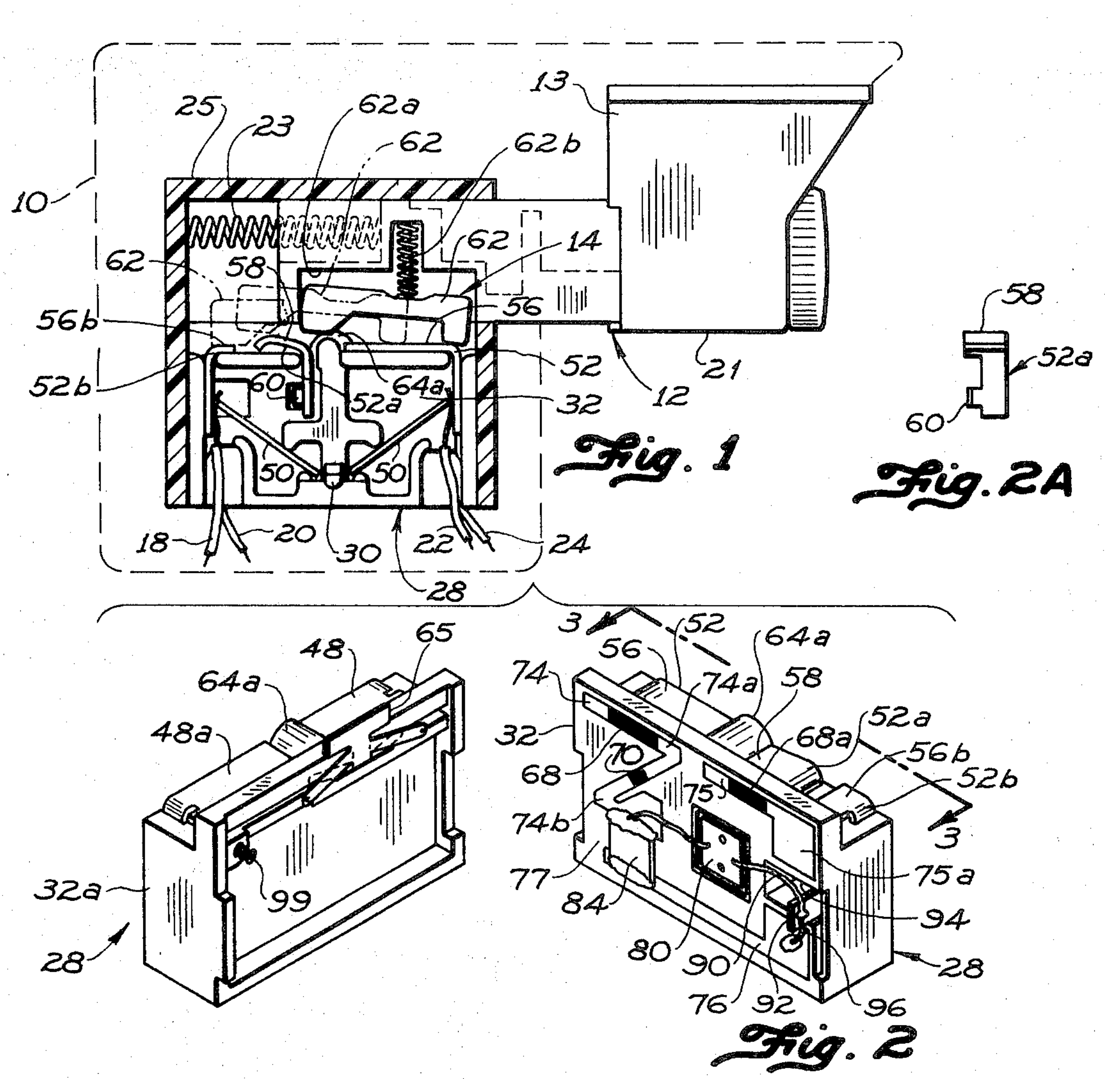
FIG. 1 is an enlarged, sectional elevational view of a trigger-switch assembly embodying the invention.
FIG. 2 is a perspective illustration of the casing and circuit components of the speed control portion of the switch, showing on the right-hand side of FIG. 2 the ceramic section of the casing and on the left-hand side of FIG. 2 the other section of the casing, which is adapted to coact with the right-hand section to form the complete speed control casing.
FIG. 2A is an end elevational view of the middle stationary contact of the group of stationary contacts on the right-hand casing section of FIG. 2.
Figure 3:
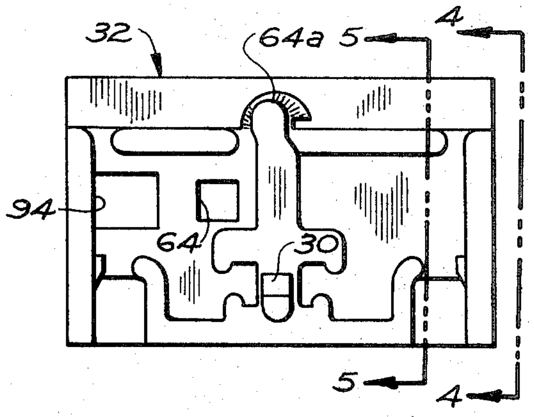
FIG. 3 is an enlarged, side elevational view taken from the exterior side of the ceramic casing section, and generally along the plane of line 3—3 of FIG. 2, looking in the direction of the arrows.
Figure 4:
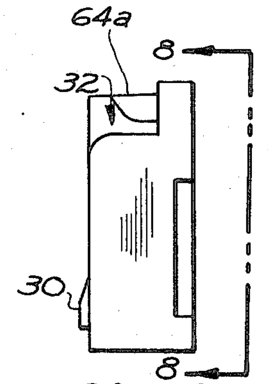
FIG. 4 is an end elevational view taken generally along the plane of line 4—4 of FIG. 3, looking in the direction of the arrows.
Figure 5:
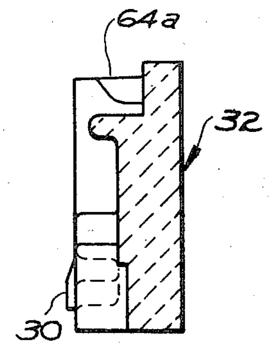
FIG. 5 is a sectional view taken generally along the plane of 5—5 of FIG. 3, looking in the direction of the arrows.

Referring now again to the drawings, and particularly FIG. 1 thereof, the latter illustrates with reference number 10 and in phantom lines, a hand tool or utensil with which the present invention may be incorporated. The tool may be of a portable type which may include a trigger-switch assembly 12 mounted thereon adapted to control the operation of an electric motor (not shown) powering the tool. The trigger 13 of the trigger-switch assembly 12 may be of the reciprocal spring-loaded type and which coacts with the speed control switch mechanism 14 in a known manner for actuation of the latter. Electrical leads 18 and 20 may extend from the speed control portion 14 to form part of an electrical cord for coupling the tool to a suitable source of electrical power. Electrical leads 22 and 24 may also extend from the switch assembly and form the connection to the electrical motor that is controlled by the switch. A spring 23 coacting between the rear wall of the switch housing 25, and a recess in the slide portion of the trigger 13 acts to urge the trigger outwardly of the housing to an "off" position.

The components of the speed control switch portion 14 are housed primarily in and on a split, two-section switch casing 28 (FIG. 2) which, in turn, is adapted to be received within the open lower section of the aforementioned housing 25 and fastened therein in generally snug relation, thus retaining the speed control switch portion in the housing 25. In this connection, each case section 32, 32*a* may be provided with a projection 30 formed on the outer side thereof, and which is adapted to be received in snap-fastened relation in complementary openings in the housing 25, when the assembled switch casing 28 is inserted into the underside of the housing 25, thus removably retaining the casing 28 therein. Housing 25 may be formed of some electrically insulating material, such as, for instance, plastic, with the side walls thereof being suitably resilient for receiving the projections 30 on casing 28 in the aforementioned openings.

Casing section 32 is formed of ceramic material, such as, for instance, unglazed porcelain, or glass, or any other suitable ceramic material. Mounted on the upper surface of casing section 32 and extending generally lengthwise therealong are a set of three electrically conducting, spaced stationary contacts 52, 52*a* and 52*b*, respectively, (FIGS. 1 and 2). Stationary contact 52 is adapted for coupling to the motor line conductor 22 while rearwardmost (with respect to FIG. 1) stationary contact 52*b* is adapted for connection to the electrical power source conductor 18. Contacts 52 and 52*b* have generally horizontally extending contact surface portions 56 and 56*b*, respectively. Stationary contact member 52*a* disposed intermediate contacts 52, 52*b*, has a relatively diagonal upwardly extending camming surface portion 58 thereon, which extends to a level above surface portion 56*b* of stationary contact 52*b* (FIG. 1). Contact 52*a* also preferably has a laterally extending arm portion 60 (FIG. 2A) which is adapted to extend into a confronting opening 64 in ceramic casing 32, for electrical coupling to a switching device of the speed control circuit, as will be hereinafter described in greater detail, thus coupling contact 52*a* in circuit with other components of the speed control circuitry.

Switch case section 32*a*, which is formed of electrical insulating material, such as for instance plastic, has mounted thereon a pair of stationary electrically conducting contacts 48, 48*a*. Stationary contact 48 is adapted for engagement with electrical lead 24 connected to one side of the electrical motor, while stationary contact 48*a* is adapted for connection to the electrical lead 20 coming from the power source. In this connection, resilient clip or spring means 50 may be provided in a known manner for positive engagement with the bared wires of the conductor lines 18 thru 24, with the respective contact being known in the art as a "plug in" terminal.

The switch 12 is of the type which makes and breaks contacts on both sides of the electrical energy source conducting lines. In other words, there is a substantially simultaneous making and breaking of the circuit in both conductor lines 22 and 24. In this connection, associated with each of the sets of stationary contacts on case sections 32, 32*a* is a bridging contact member 62, and as shown in the aforementioned U.S. Pat. No. 3,536,973. Each bridging contact member 62 may comprise an elongated body portion of electrical conducting material received in an associated slot 62*a* (FIG. 1) formed in the corresponding side of the body portion of the trigger 13. Thus the bridging contact members are movable with the trigger during inward and outward movement of the trigger into and out of the housing portion 25. Each bridging contact member may have a spring 62*b* coacting therewith for urging the bridging contact member downwardly toward the underlying set of stationary contacts.

Each casing section may have an abutment or projection 64*a* extending upwardly with respect thereto for maintaining the associated bridging contact member in an upwardly swung position with respect to the underlying stationary contact 48*a* or 52*b* or 52*a* when the trigger is in the "off" position, as illustrated for instance in full lines in FIG. 1, and in a manner known in the art.

In this embodiment of case section 32, abutment 64*a* is formed of ceramic material as a unitary part of the ceramic module. Inward movement of the trigger 13 causes the bridging contact members 62 to be moved rearwardly with the trigger or, in other words, inwardly of the housing 25, such inwardly movement causing the contact members 62 to move from the "off" position illustrated in full lines for instance in FIG. 1, and causes the bridging contact members to slide along the respective underlying stationary contact members. Due to the action of the associated spring 62*b*, the bridging contacts are moved generally simultaneously downwardly into engagement with the underlying stationary contacts 48*a* or 52*a*, thereby placing the switch in "on" position. During the aforementioned movement, the bridging contacts slide over, upon and relative to the associated projection 64*a* to thus carry the bridging contact over the associated projection until the latter is received within the recessed area of the respective bridging contact.

Figures 6, 7, 8, 9, 10, 11, 12:
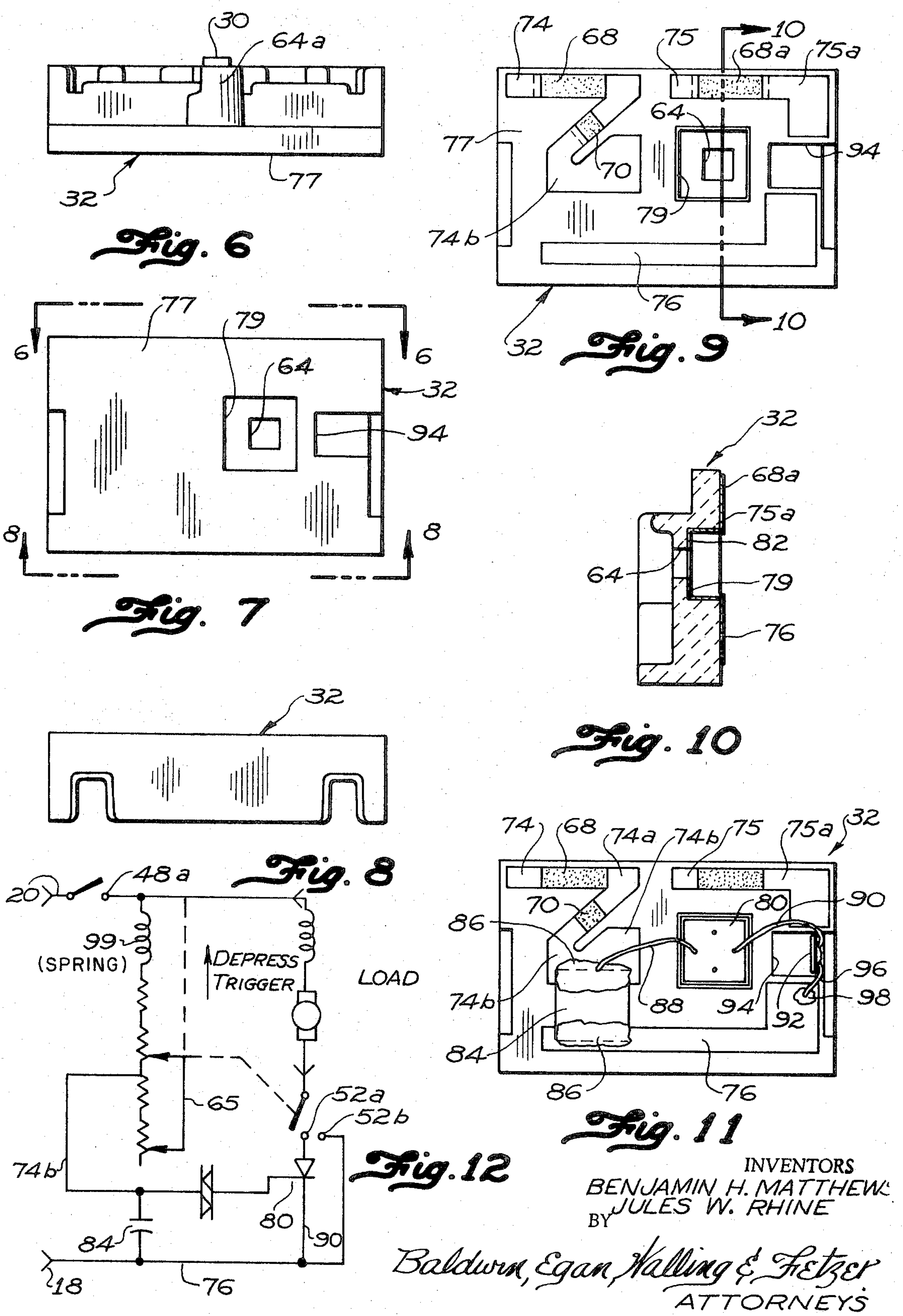
FIG. 6 is a top plan view of the ceramic casing section of FIG. 3.
FIG. 7 is an enlarged elevational view of the other or inner side of the ceramic casing section of FIG. 3.
FIG. 8 is a bottom plan view taken generally along the plane 8—8 of FIG. 7, looking in the direction of the arrows.
FIG. 9 is an elevational view of the ceramic casing section generally similar to FIG. 7, but illustrating the resistance and conductive portions of the printed circuitry of the speed control switch circuitry having been applied to the ceramic casing section.
FIG. 10 is a sectional view taken generally along the plane of line 10—10 of FIG. 9, looking in the direction of the arrows.
FIG. 11 is an elevational view of the ceramic section of the switch casing, showing other of the circuit components mounted thereof, and coupled in the circuit to the printed circuitry.
FIG. 12 is a schematic of the switch circuitry.

Also removably coupled to the trigger is an electrically conducting slide element or contactor 65 (FIG. 2) which is adapted for sliding engagement with the spaced resistance sections 68, 68*a* formed or deposited on the ceramic case section 32. The resistance sections may be formed by known printed circuit forming means and then baked onto the confronting surface of the ceramic support section 32, such resistance sections possessing a preselected value of resistance. The resistance sections may be applied as for instance by a known silk screen printing process, and then passed through an oven to bake the resistance material, which may be for instance a Ruthenium based ink. It will be understood, however, that the resistance sections could be formed of other resistance materials, such as for instance a carbon based ink or a Silver paladium base. Also, resistance section 70 may be applied to the ceramic module section 32 by means of the aforementioned silk screen printing process and then baked, and thereafter conducting sections 74, 74*a*, 74*b*, 75, 75*a*, and 76 are applied to the ceramic case section 32 by means of the aforementioned silk screen printing process and hardened in a furnace. It will be seen that conducting section 74*a* couples the fixed resistance section 70 in series with variable resistance section 68. The aforementioned conducting sections 74 thru 76 may be formed of any suitable conducting material, such as, for instance, a silver based ink. Preferably resistance sections 68, 70 are formed as one unitary generally V-shaped strip section during the printing and then the conductive portions are printed over the resistance strip to divide the printed resistance strip section into the portions 68, 70. The inner side surface 77 of the ceramic module has a recess 79 (FIGS. 7 and 9) formed therein, which recess communicates via the aforementioned opening 64 with the opposite or outer side of the ceramic module, such opening 64 providing access for coupling the intermediate stationary contact 52*a* into circuit with semiconductor switching means 80, which may be, for instance, an SCR, and associated triggering device. Component 80 of the speed control circuitry, as can be seen in FIGS. 2 and 11, is adapted to be received in the recess 79 so that it is substantially flush with inner side surface 77 of the ceramic module 32. The recess 79 may be lined with a coating of conductive materials such as, for instance, the aforementioned silver, thereby providing good heat transfer characteristics for the semiconductor switching component 80. It will be seen that the ceramic section 32 serves as a heat sink for such switching component, and obviates the usual necessity of providing a separate extensive size metallic part for a heat sink. The aforementioned triggering device may be of any suitable type, such as, for instance, a Diac which, in turn, is coupled in circuit with condenser 84 bridging the printed conductive section 74*b* and the printed circuit conductive section 76 as shown for instance in FIGS. 11 and 12. Condenser 84 may be soldered to such conductive sections 74*b*, 76 as best shown in FIG. 11.

The cathode of the switching means, or SCR, is coupled via lead 90 (FIG. 12) to arm 92 of rearward stationary contact 52*b*. Arm 92 projects through an opening 94 communicating the exterior side of the ceramic case section 32 with the interior side 77 thereof. Arm 92 of stationary contact 52*b* is also coupled via lead 96 with the printed circuit conducting section 76, and may be soldered thereto as at 98 (FIG. 11). While a Diac has been identified as the triggering component for the speed control circuitry, it will be understood that other types of triggering means could be utilized such as, for instance, the known neon lamp specified in the aforementioned U.S. Pat. No. 3,536,973.

After the printing of the printed circuit portions of the speed control circuitry onto the ceramic case section 32 and the baking thereof at a temperature of for instance from 500°–900°C, has been accomplished, the assembly of the other components onto case section 32, such as for instance, the stationary group of contacts, the switching means 80 and the condenser 84, can be readily accomplished. All of the soldering operations for connecting such components into circuit with the printed circuit sections of the circuitry are preferably performed at one time in a single automatic operation, utilizing, for instance, an electric heating furnace at a temperature of approximately 450°F, thus materially enhancing the economics of the switch. It will be seen that the soldering of stationary contact 52*a* to switching means 80 on the exterior side of case section 32 can be accomplished simultaneously with the soldering operations on the inner side 77 of the case section 32. After completion of the speed control case sections 32, 32*a* and assembly thereof, the speed control portion 28 may be readily assembled into the underside of the switch housing 25 as aforementioned, with the slide contactor of the speed control rheostat coacting with the trigger for movement therewith. In the assembled condition of the speed control case 28, resilient connector 99 (FIGS. 2 and 12) which may be an electrically conducting spring secured to stationary contact 48*a* on case section 32*a*, electrically couples such stationary contact to conductive printed circuit portion 75*a* on case section 32.

While soldering has been specified as the preferred arrangement for coupling the speed control components in circuit, it will be understood that other means such as "plug in" connections or other fastener arrangements could be utilized; as for instance, the coupling of the switching means 80 to intermediate stationary contact 52*a* might be readily accomplished by means of a threaded fastener arrangement.

From the foregoing description and accompanying drawings, it will be seen that the invention provides a novel compact electric switch for controlling an electric motor, with the switch including a sectional switch case which mounts various of the switch circuit components thereon, and with at least one section of the switch case being formed of ceramic material providing a support for the components of the switch circuit, and facilitating the application of the printed circuit portion of the switch circuit to the switch case, and the assembly of the other components into circuit with the printed circuit components, and wherein such ceramic switch case provides a heat sink for the semiconductor switching means of the circuitry.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a compact electronic speed control for controlling the speed of a motor in a portable tool, said control comprising a housing including a movable actuator for controlling actuation of said control, a casing removably received in said housing for coaction with said actuator, said casing having at least two spaced groups of stationary electrical contact means mounted thereon, one of said groups of stationary contact means having at least two spaced contacts, a pair of bridging contact members carried by said movable actuator, each being movable with respect to a corresponding one of said groups of stationary contact means from an off position wherein said bridging contact members are each spaced from at least one of the stationary contacts of its associated group and to an on position wherein each bridging contact member engages two contacts of its said associated group in electrical conducting relation effective to connect the motor to a source of energy, each of said bridging contact members being adapted for connection to a respective conducting line from a source of electrical energy for opening and closing the respective conducting line upon predetermined movement of the bridging contact member with its associated group of stationary contact means, said casing having coacting sections interlocked together, each of said sections mounting one of said groups of stationary contact means thereon, at least one of said casing sections being formed of ceramic material of generally polygonal block-like configuration and having a generally flat inner side surface, a first recess in said ceramic section opening to the inner side surface thereof, solid-state switching means disposed in said first recess, said one ceramic section mounting a plurality of other speed control circuit components thereon including resistance strip means formed on said inner surface and coupled in circuit with said switching means and said stationary contact means, said group of said stationary contact means on said one ceramic section comprising a pair of end contacts and a contact intermediate said end contacts and disposed in spaced relation along the top surface of said one section and adjacent to said resistance strip means, said top surface being disposed in a plane generally perpendicular to the plane of said inner surface, said ceramic section having a plurality of apertures formed therein and extending therethrough from one side to the other side thereof, contact means carried by said actuator engageable with said resistance strip means operable in response to the movement of said actuator to vary the resistance of said strip means connectible to said speed control circuit components, a cam projection integrally formed on said top surface of said ceramic section generally centrally thereof and extending in the direction of movement taken by the bridging contact member associated with said stationary contact means carried on said ceramic casing section and adapted for camming coaction with its said bridging contact member in the off position of said control, said apertures being disposed below said cam projection, one of said apertures communicating with said first recess on said inner side surface of said ceramic section, a projection on the intermediate stationary contact extending through said one aperture and conductively connecting with said switching means, another of said apertures extending through said section, a projection on one of the end contacts on said ceramic section extending through said other aperture for coupling said switching means in circuit to said one end stationary contact, and said ceramic section providing a heat sink for said switching means.

2. A compact electronic speed control as defined in claim 1 and which includes means on said casing sections to releasably lock said casing in the housing.

3. A compact electronic speed control as defined in claim 1 and wherein the recess is lined with an electrically conductive material providing conductive communication between said switching means and the projection on said intermediate stationary contact.

4. A compact electronic speed control as defined in claim 1 and wherein the cam projection is formed of insulating material and disposed between the remaining end contact and the intermediate contact of said group of contact means carried on said ceramic casing section.

* * * * *